Oct. 28, 1958     G. SCHLAPP     2,858,172
GUIDE MEANS FOR THREE-DIMENSIONALLY MOVABLE RODS
Filed March 26, 1954
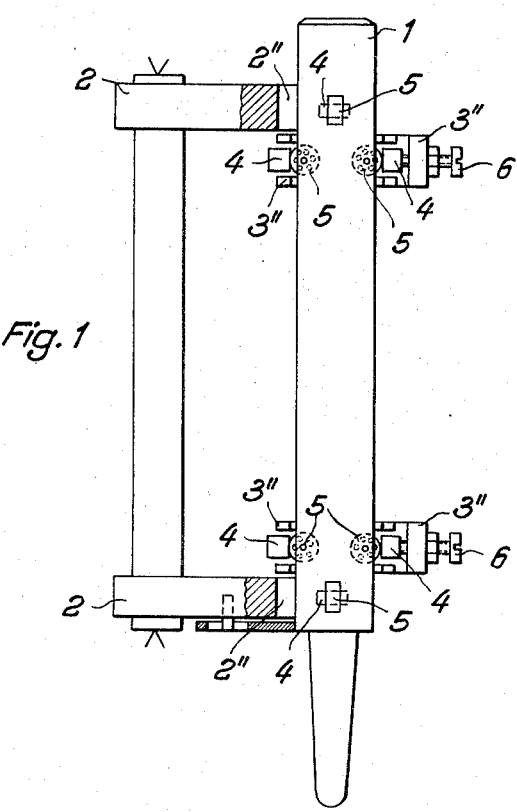
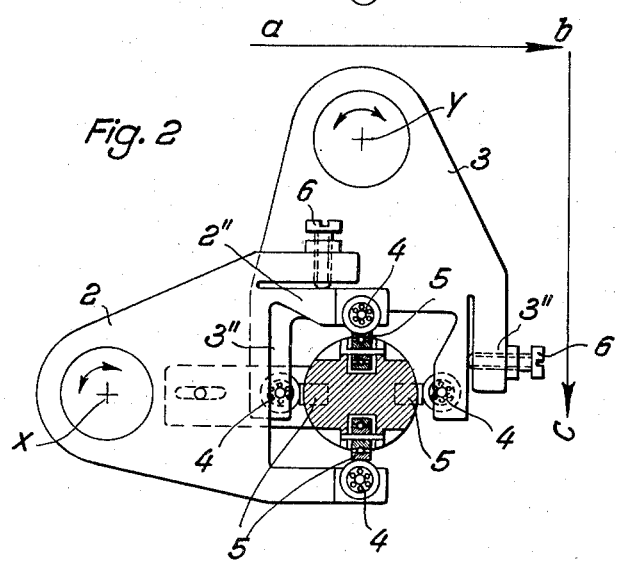
Inventor:
Georg Schlapp
Bailey, Stephens and Huettig,
Attorneys

United States Patent Office 2,858,172
Patented Oct. 28, 1958

2,858,172

GUIDE MEANS FOR THREE-DIMENSIONALLY MOVABLE RODS

Georg Schlapp, Langen, Frankfurt am Main, Germany, assignor to Hanns Fickert, Langen, Frankfurt am Main, Germany Application March 26, 1954, Serial No. 419,053

4 Claims. (Cl. 308—6)

The invention relates to guide means for three-dimensionally movable rods and refers particularly to guides for the tracer bar of copying milling machines.

There are many cases in which rods must be guided in axial direction with extremely low friction. This is of importance particularly in control and governing devices for instance in a control or guide rods or spindles of copying milling machines. Such spindles make very small movements of only a few tenths of a millimeter in order to control electrical contacts or hydraulic control pistons.

It is an object of the present invention to reduce the friction in the guide means of such spindles to an heretofore unknown small value and to effect the mounting in such a manner that it is absolutely free from play. This is accomplished by the invention in a new manner by arranging the rod, for instance the tracer spindle of a copying milling machine, in forks by means of roller bearings having their axes at right angles with respect to each other. The anti-friction bearings are preloaded to such an extent, that the movement is free from play.

For a better understanding of the invention, reference is made to the following description and attached drawings, in which—

Fig. 1 shows a view of a tracer guide and

Fig. 2 shows the roller bearings in a cross-section through a point of the mechanism where the guide fork and the guide spindle engage each other.

The tracer spindle is mounted in two pairs of forks 2 and 3 which are adapted to be oscillated around vertical axes $x$ and $y$, and which surround with their forked arms 2″ and 3″, a spindle to be guided, in the present case a tracer spindle 1 provided with a tracer head of a copying milling machine. Small roller bearings 4 are arranged in pairs opposite to one another and rotatable around vertical axes in the arms 2″ and 3″ of the pairs of forks 2 and 3, so that the tracer spindle 1 as shown in Fig. 2, is guided in its upper as well as in its lower portion by two pairs each of oppositely disposed roller bearings 4. Counter roller bearings 5 are mounted in the tracer spindle opposite to the roller bearings 4 in the respective planes. These counter bearings are, however, rotatable around horizontal axes so that the axes of the roller bearings 4 and 5 touching each other with their peripheries contacting at an angle of 90°.

If for instance the tracer spindle is moved up and downwardly the rolls 5 roll upon surface lines of the counter bearing 4 lying parallel to the tracer spindle 1. If the tracer spindle is deflected in lateral direction for instance in one of the directions $a$—$b$ or $b$—$c$ of Fig. 2, then the roller bearings 4 roll on surface lines of the inner roller bearings 5 vertically to the axes of the tracer spindle 1.

It is apparent that in consequence of this new guide arrangement the friction at the points of contact between tracer spindle and tracer guide and therefore also the forces for overcoming the friction are very small.

In order to produce a contact between bearings free from play, the arms of the forks may be made somewhat resilient on one side by a slot so that the resilient arms are preloaded by being pressed together by tightening screws 6 and the contact pressure of the oppositely disposed roller bearings may be adjusted exactly.

What is claimed is:

1. Guide means for three-dimensionally movable rods adapted to be used as tracer spindles of copying machines comprising guiding forks disposed at an angle with respect to each other, a movable rod, two pairs of roller bearings associated with each fork and having their axes at an angle of 90° with respect to each other, one of the bearings in each of said pairs of bearings being mounted in the rod, and the other bearing in each of said pairs of bearings being mounted in one of the guiding forks and contacting the first named bearing.

2. Guide means as in claim 1, further comprising one of the arms of each of said forks being rigid and the other arm of that fork being resilient for producing a contact free from play between said contacting bearings.

3. Guide means as in claim 1, further comprising a first pair of guiding forks in adjacent parallel planes and engaging the upper portion of said rod, and a second similar pair of guiding forks engaging the lower portion of said rod.

4. Guide means as in claim 1, further comprising preloading means for said forks for producing a contact free from play between contacting roller bearings.

References Cited in the file of this patent

UNITED STATES PATENTS

| | | |
|---|---|---|
| 1,668,518 | Shaw et al. | May 1, 1928 |
| 2,118,514 | Johnson | May 24, 1938 |
| 2,326,795 | Osplack | Aug. 17, 1943 |